(12) United States Patent
Lee et al.

(10) Patent No.: US 10,389,178 B2
(45) Date of Patent: Aug. 20, 2019

(54) METHOD FOR CONTROLLING DC-AC CONVERTER AND GROUND ASSEMBLY AND WIRELESS POWER TRANSFER METHOD USING THE SAME

(71) Applicant: HYUNDAI MOTOR COMPANY, Seoul (KR)

(72) Inventors: Woo Young Lee, Yongin-si (KR); Hyun Wook Seong, Hwaseong-si (KR); Gyu Yeong Choe, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 205 days.

(21) Appl. No.: 15/339,262

(22) Filed: Oct. 31, 2016

(65) Prior Publication Data

US 2017/0126062 A1    May 4, 2017

(30) Foreign Application Priority Data

Nov. 2, 2015    (KR) .......................... 10-2015-0153200

(51) Int. Cl.
| | |
|---|---|
| *H02J 50/10* | (2016.01) |
| *H02M 3/158* | (2006.01) |
| *H02M 3/335* | (2006.01) |
| *H02J 50/12* | (2016.01) |
| *H02J 7/02* | (2016.01) |
| *H02J 50/80* | (2016.01) |
| *B60L 53/12* | (2019.01) |

(52) U.S. Cl.
CPC .............. *H02J 50/10* (2016.02); *B60L 53/12* (2019.02); *H02J 7/025* (2013.01); *H02J 50/12* (2016.02); *H02J 50/80* (2016.02); *H02M 3/158* (2013.01); *H02M 3/33523* (2013.01); *Y02T 10/7005* (2013.01); *Y02T 10/7072* (2013.01); *Y02T 90/122* (2013.01); *Y02T 90/127* (2013.01); *Y02T 90/14* (2013.01)

(58) Field of Classification Search
CPC ....................................................... H02J 50/10
USPC .......................................................... 307/104
See application file for complete search history.

(56) References Cited

U.S. PATENT DOCUMENTS

| | | | | |
|---|---|---|---|---|
| 6,118,675 | A * | 9/2000 | Lionetto ................. | H02M 1/36 363/21.13 |
| 9,269,489 | B2 * | 2/2016 | Wu ......................... | H01F 38/14 |
| 2016/0056639 | A1 * | 2/2016 | Mao ........................ | H02J 50/80 307/104 |
| 2016/0056704 | A1 * | 2/2016 | Deboy .............. | H02M 3/33592 363/21.13 |

(Continued)

*Primary Examiner* — Joseph Chang
(74) *Attorney, Agent, or Firm* — Morgan, Lewis & Bockius LLP

(57) ABSTRACT

Disclosed are DC-to-AC converter control methods, ground assemblies and wireless power transfer methods using the same. A method for controlling a DC-to-AC converter of a ground assembly used for wireless power transfer, which includes first, second, third, and fourth switches arranged in a form of a bridge circuit between a power source and a primary coil, may comprise detecting a current flowing through the primary coil at a rising edge of an output voltage signal of the DC-to-AC converter; determining whether a strength of the current is at a negative level which falls within a predetermined reference range; and in response to a determination that the current is not at the negative level, changing switching frequencies of the DC-to-AC converter.

9 Claims, 10 Drawing Sheets

(56) References Cited

U.S. PATENT DOCUMENTS

| | | | |
|---|---|---|---|
| 2016/0066375 A1* | 3/2016 | Seki | H05B 33/0815 315/224 |
| 2016/0099649 A1* | 4/2016 | Hara | H02M 3/3353 363/17 |

* cited by examiner

FIG. 9
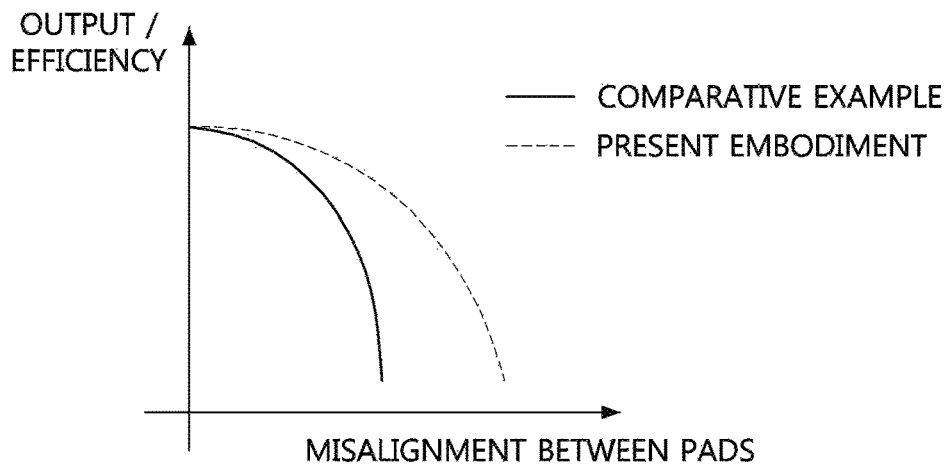
(a)
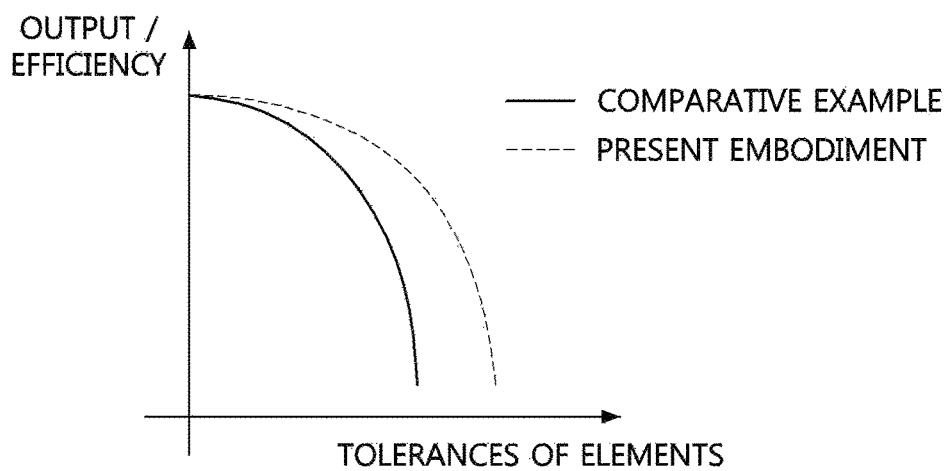
(b)
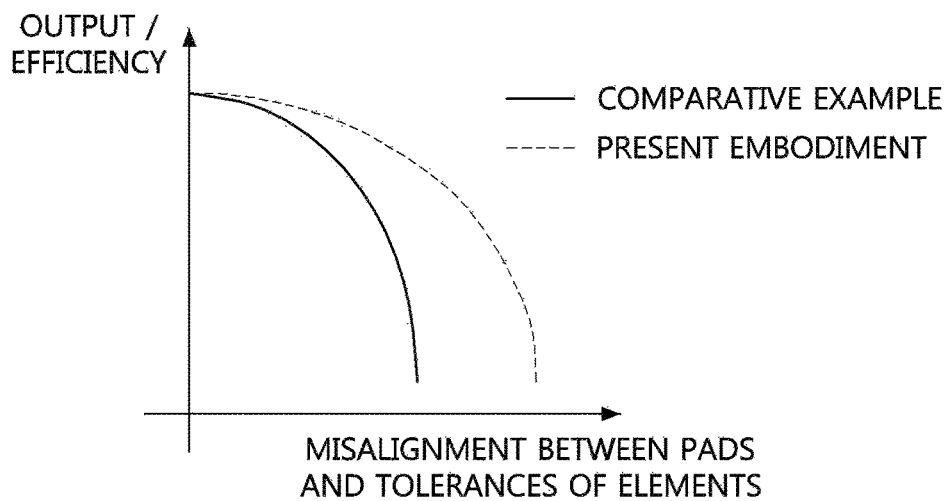
(c)

US 10,389,178 B2

METHOD FOR CONTROLLING DC-AC CONVERTER AND GROUND ASSEMBLY AND WIRELESS POWER TRANSFER METHOD USING THE SAME

CROSS-REFERENCE TO RELATED APPLICATION

This application claims priority to Korean Patent Application No. 2015-0153200 filed on Nov. 2, 2015 in the Korean Intellectual Property Office (KIPO), the entire contents of which are hereby incorporated by reference.

TECHNICAL FIELD

The present disclosure relates to a wireless power transfer system, and more particularly, to a method for controlling a DC-to-AC converter, a ground assembly using the same, and a wireless power transfer method using the same.

BACKGROUND

Due to environmental pollution and oil energy depletion, world-wide studies on environment-friendly electric vehicles (EV) are going along. As demands for and developments on EVs and plug-in hybrid vehicles (PHEV) increase, an on-board charger (OBC) for high-voltage battery charging becomes an essential component in automotive industry. Meanwhile, instead of conductive charging in which connectors are used, wireless power transfer (WPT) technologies used for charging high-voltage batteries without connectors have been introduced.

In a wireless charging system for EV charging, a primary pad and a secondary pad can be modeled as a transformer in an equivalent circuit. As compared with conventional converter transformers, a coupling coefficient is relatively low since an air-gap between the primary pad and the secondary pad is very large. That is, since magnetizing inductance is much larger than leakage inductance, it may become difficult to transfer power to an output. Therefore, a method, in which at least one capacitor is applied to the primary pad and secondary pad so that a resonance between the pads is caused by inductance and capacitance of the pads, is used usually.

Usually, a phase-shifted full-bridge converter is used as a converter for the wireless power transfer system, which is connected to a front end of the primary pad. Also, a zero voltage switching (ZVS) technique is used for improving efficiency of the converter. It is not so difficult to design the converter to achieve ZVS by using capacitances of the primary and secondary pads.

However, misalignment between the primary and secondary pads, manufacturing tolerances of the pads and capacitors, and different characteristics of them may break their resonance during wireless charging. Also, in this reason, inverse-currents flowing through switches in the converter may be generated excessively, ZVS of the converter may not be guaranteed, and efficiency of the wireless power transfer system may degrade rapidly.

Also, switches having large current capacity should be used in order to cope with the inverse-currents. In addition, if the ZVS is not guaranteed, increase of electromagnetic interference (EMI) caused by hard switching may demand an additional filter for reducing the EMI, whereby the size and material cost of the total system are increased.

SUMMARY

Accordingly, exemplary embodiments of the present disclosure are provided to substantially obviate one or more problems due to limitations and disadvantages of the related art.

Exemplary embodiments of the present disclosure provide a direct current to alternating current (DC-to-AC) converter, which can minimize inverse-currents flowing through switches and guarantee ZVS even when misalignment between primary and secondary pads and/or manufacturing tolerances of pads and capacitors exist in a wireless power transfer system or a wireless charging system.

Exemplary embodiments of the present disclosure also provide a ground assembly providing high efficiency and performance by using the above-described –DC-to-AC converter.

Exemplary embodiments of the present disclosure also provide a wireless power transfer method which can enhance stability and reliability of wireless power transfer by using the DC-to-AC converter.

In order to achieve the above-described objective, an aspect of the present disclosure provides a method for controlling a direct current to alternating current (–DC-to-AC) converter of a ground assembly used for wireless power transfer, which includes first, second, third, and fourth switches arranged in a form of a bridge circuit between a power source and a primary coil. The method may comprise detecting a current flowing through the primary coil at a rising edge of an output voltage signal of the DC-to-AC converter; determining whether the detected current is at a negative level which falls within a predetermined reference range; and in response to a determination that the current is not at the negative level which falls within the predetermined reference range, changing switching frequencies of the DC-to-AC converter.

Also, in the determining, it may be determined whether the detected current is at an excessive negative level which does not fall within the predetermined reference range.

Here, in response to a determination that the detected current is at the excessive negative level, the switching frequencies of the DC-to-AC converter may be decreased.

Here, in response to a determination that the detected current is at a positive level, the switching frequencies of the DC-to-AC converter may be increased.

Also, in the detecting, a first current flowing through the primary coil may be detected at a first rising edge to a positive pule of the output voltage signal, and a second current flowing through the primary coil may be detected at a second rising edge to a negative pulse of the output voltage signal.

Here, in the determining, it may be determined whether the second current is at an excessive negative level which does not fall within the predetermined reference range.

Also, in response to a determination that the second current is at the excessive negative level, the switching frequencies of the –DC-to-AC converter may be decreased.

In order to achieve the above-described objective, another aspect of the present disclosure provides a ground assembly comprising a first power converting part connected to a power source; a primary coil; a direct current to alternating current (DC-to-AC) converter including first, second, third, and fourth switches arranged in a form of a full bridge circuit between the first power converting part and the primary coil; a sensor connected to the primary coil and detecting a current and a voltage of the primary coil; and a controller connected to the sensor and controlling the DC-to-AC converter. The controller detects, via the sensor, a first current flowing through the primary coil at a first rising edge of an output voltage signal of the DC-to-AC converter and a second current flowing through the primary coil at a second rising edge of the output voltage signal of the DC-to-AC converter, and changes switching frequencies of the DC-to-AC converter according to a level of the first current or the second current.

Also, the controller may decrease the switching frequencies of the DC-to-AC converter, in response to a determination that the first current has an excessive negative level lower than a first reference level which is negative at the first rising edge, and the second current has an excessive positive level higher than a second reference level which is positive at the second rising edge.

Also, the controller may increase the switching frequencies of the DC-to-AC converter in response to a determination that the first current has a positive level at the first rising edge.

Also, the controller may comprise a sensing part configured to detect a level of a voltage or current sensed by the sensor; a comparison part configured to compare the level of the current with zero or the first and second reference levels; and an adjusting part configured to change switching frequencies of the DC-to-AC converter according to a comparison result of the comparison part.

Also, the ground assembly may further comprise a realignment part configured to realign the primary coil and a secondary coil by moving the primary coil, the secondary coil, or both according to a current output power level after the adjusting part changes the switching frequencies.

Also, the DC-to-AC converter may be a phase-shifted full-bridge converter.

Also, in the DC-to-AC converter, a first terminal of the first switch is connected to a second terminal of the third switch, a second terminal of the first switch and a first terminal of the third switch are connected to both ends of the primary coil, a first terminal of the fourth switch is connected to a second terminal of the second switch, a second terminal of the fourth switch and a first terminal of the second switch are connected to the both ends of the primary coil, and a first connection node of the first and third switches and a second connection node of the fourth and second switches are connected to both output ends of the first power converting part.

In order to achieve the above-described objective, still another aspect of the present disclosure provides a wireless power transfer method performed in a controller of a wireless power transfer system. The method may comprise detecting a first current flowing through a primary coil at a first rising edge of an output voltage signal of a direct current to alternating current (DC-to-AC) converter located between a power source and the primary coil; detecting a second current flowing through the primary coil at a second rising edge of the output voltage signal of the DC-to-AC converter; and changing switching frequencies of the DC-to-AC converter according to a level of the first current or the second current.

Also, in response to a determination that at the first rising edge, the first current is at an excessive negative level lower than a first reference level which is negative, the switching frequencies of the DC-to-AC converter may be decreased.

Also, in response to a determination that at the second rising edge, the second current is at an excessive positive level higher than a second reference level which is positive, the switching frequencies of the DC-to-AC converter may be decreased.

Also, in response to a determination that at the first rising edge, the first current is at a positive level, the switching frequencies of the DC-to-AC converter may be increased.

Also, the method may further comprise, after the changing, comparing a current output of the wireless power transfer system with a reference output; and realigning the primary coil and a secondary coil which inductively couples with the primary coil by moving the primary coil, the secondary coil, or both according to a comparison result in the comparing.

Also, the controller may include at least one of a ground assembly (GA) controller included in a GA of the wireless power transfer system, a controller in the DC-to-AC converter in the GA, and a vehicle assembly (VA) controller connected with the GA controller via a wireless communication link.

According to the above-described DC-to-AC converter control method, ground assembly, and wireless power transfer method, even when misalignment between primary and secondary pads of a wireless charging system or wireless power transfer system exists, or manufacturing tolerances of the pads or capacitors used for the pads exist, inverse currents flowing through switches can be minimized, and zero voltage switching (ZVS) can be guaranteed.

Also, even when misalignment between the primary pad and the secondary pad exists in forward/backward, left/right, upward/downward, or their combinational direction, the efficiency and output of the system may gradually degrade without rapid degradation. In addition, during a time period obtained by preventing the rapid degradation of the efficiency and output, the pads can be realigned in accordance with determination on whether the primary and secondary pads are properly aligned.

Also, as compared to the conventional structure having similar performance (efficiency and output), the size and material cost of the wireless power transfer system can be reduced.

BRIEF DESCRIPTION OF DRAWINGS

Exemplary embodiments of the present disclosure will become more apparent by describing in detail exemplary embodiments of the present disclosure with reference to the accompanying drawings, in which:

FIG. 9 is a graph showing an advantage of a DC-to-AC converter control method according to an exemplary embodiment of the present disclosure;

DETAILED DESCRIPTION

Figure 1:
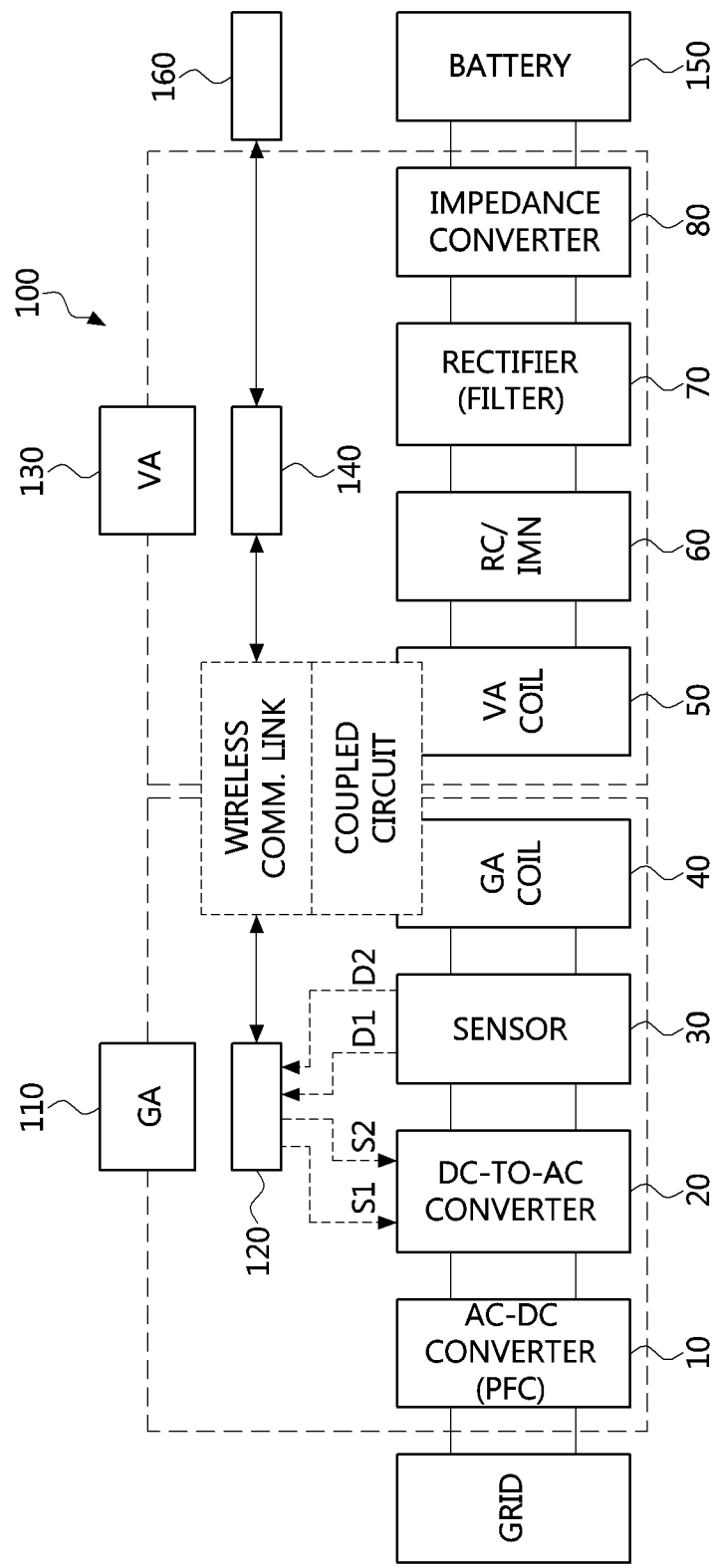
FIG. 1 is a block diagram of a wireless power transfer system using a DC-to-AC converter according to an exemplary embodiment of the present disclosure.

Exemplary embodiments of the present disclosure are disclosed herein. However, specific structural and functional details disclosed herein are merely representative for purposes of describing exemplary embodiments of the present disclosure, however, exemplary embodiments of the present disclosure may be embodied in many alternate forms and should not be construed as limited to exemplary embodiments of the present disclosure set forth herein. While describing the respective drawings, like reference numerals designate like elements.

It will be understood that although the terms "first", "second", etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the exemplary embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

'Electric Vehicle, EV': An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

'Plug-in Electric Vehicle, PEV': An Electric Vehicle that recharges the on-vehicle primary battery by connecting to the power grid.

'Plug-in vehicle, PV': An electric vehicle rechargeable through wireless charging from an electric vehicle supply equipment (EVSE) without using a physical plug or a physical socket.

'Heavy duty vehicle; H.D. Vehicle': Any four-or more wheeled vehicle as defined in 49 CFR 523.6 or 49 CFR 37.3 (bus).

'Light duty plug-in electric vehicle': A three or four-wheeled vehicle propelled by an electric motor drawing current from a rechargeable storage battery or other energy devices for use primarily on public streets, roads and highways and rated at less than 4,545 kg gross vehicle weight.

'Wireless power charging system, WCS': The system for wireless power transfer and control between the GA and VA including alignment and communications. This system transfers energy from the electric supply network to the electric vehicle electromagnetically through a two-part loosely coupled transformer.

'Wireless power transfer, WPT': The transfer of electrical power from the AC supply network to the electric vehicle by contactless means.

'Utility': A set of systems which supply electrical energy and include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

'Smart charging': A system in which EVSE and/or PEV communicate with power grid in order to optimize charging ratio or discharging ratio of EV by reflecting capacity of the power grid or expense of use.

'Automatic charging': A procedure in which inductive charging is automatically performed after a vehicle is located in a proper position corresponding to a primary charger assembly that can transfer power. The automatic charging may be performed after obtaining necessary authentication and right.

'Interoperability': A state in which component of a system interwork with corresponding components of the system in order to perform operations aimed by the system. Also, information interoperability may mean capability that two or more networks, systems, devices, applications, or components can efficiently share and easily use information without giving inconvenience to users.

'Inductive charging system': A system transferring energy from a power source to an EV through a two-part gapped core transformer in which the two halves of the transformer, primary and secondary coils are physically separated from one another. In the present disclosure, the inductive charging system may correspond to an EV power transfer system.

'Inductive coupler': The transformer formed by the coil in the GA Coil and the coil in the VA Coil that allows power to be transferred with galvanic isolation.

'Inductive coupling': Magnetic coupling between two coils. In the present disclosure, coupling between the GA Coil and the VA Coil.

'Ground assembly, GA': An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

'Vehicle assembly, VA': An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

'Primary device': An apparatus which provides the contactless coupling to the secondary device. That is, the primary device may be an apparatus external to an EV. When the EV is receiving power, the primary device may act as the source of the power to be transferred. The primary device may include the housing and all covers.

'Secondary device': An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

'GA controller': The portion of the GA which regulates the output power level to the GA Coil based on information from the vehicle.

'VA controller': The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

'Magnetic gap': The vertical distance between the plane of the higher of the top of the litz wire or the top of the magnetic material in the GA Coil to the plane of the lower of the bottom of the litz wire or the magnetic material in the VA Coil when aligned.

'Ambient temperature': The ground-level temperature of the air measured at the subsystem under consideration and not in direct sun light.

'Vehicle ground clearance': The vertical distance between the ground surface and the lowest part of the vehicle floor pan.

'Vehicle magnetic ground clearance': The vertical distance between the plane of the lower of the bottom of the litz wire or the magnetic material in the VA Coil mounted on a vehicle to the ground surface.

'VA Coil magnetic surface distance': the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

'Exposed conductive component': A conductive component of electrical equipment (e.g. an electric vehicle) that may be touched and which is not normally energized but which may become energized in case of a fault.

'Hazardous live component': A live component, which under certain conditions can give a harmful electric shock.

'Live component': Any conductor or conductive component intended to be electrically energized in normal use.

'Direct contact': Contact of persons with live components. (See IEC 61440)

'Indirect contact': Contact of persons with exposed, conductive, and energized components made live by an insulation failure. (See IEC 61140)

'Alignment': A process of finding the relative position of primary device to secondary device and/or finding the relative position of secondary device to primary device for the efficient power transfer that is specified. In the present disclosure, the alignment may direct to a fine positioning of the wireless power transfer system.

'Pairing': A process by which a vehicle is correlated with the unique dedicated primary device, at which it is located and from which the power will be transferred. The pairing may include the process by which a VA controller and GA controller of a charging spot are correlated. The correlation/association process may include the process of the establishment of a relationship between two peer communication entities.

'Command and control communication': The communication between the EV supply equipment and the EV exchanges information necessary to start, control and terminate the process of WPT.

'High level communication (HLC)': HLC is a special kind of digital communication. HLC is necessary for additional services which are not covered by command & control communication. The data link of the HLC may use a power line communication (PLC), but it is not limited.

'Low power excitation (LPE)': LPE means a technique of activating the primary device for the fine positioning ad pairing so that the EV can detect the primary device, and vice versa.

The charging station may comprise at least one GA and at least one GA controller managing the at least one GA. The GA may comprise at least one wireless communication device. The charging station may mean a place having at least one GA, which is installed in home, office, public place, road, parking area, etc.

Hereinafter, preferred exemplary embodiments according to the present disclosure will be explained in detail by referring to accompanying figures.

FIG. 1 is a block diagram of a wireless power transfer system using a DC-to-AC converter according to an exemplary embodiment of the present disclosure.

Referring to FIG. 1, a wireless power transfer system 100 according to an embodiment may comprise a GA 110 and a VA 130.

The GA 110 may comprise an alternating current to direct current (AC-to-DC) converter 10 having a power factor correction (PFC) function which is connected to a grid, a DC-to-AC converter 20, a sensor 30, and a GA coil 40. The GA 110 may further comprise a GA controller 120. The GA controller 120 may receive detected signals D1 and D2 from the sensor 30, and output control signals S1 and S2 for controlling switches in the DC-to-DC converter 20 based on the received detected signals D1 and D2. The GA 110 may further comprise a DC-to-AC converter, a filter, an impedance matching network (IMN), a resonance circuit (RC), and so on. However, depiction of them is omitted in FIG. 1.

The VA 130 may comprise a VA coil 50 forming a coupled circuit with the GA coil 40, an RC/IMN 60, a rectifier 70 having a filter function, and an impedance converter 80. The impedance converter 80 may be connected to a battery 150. The VA 130 may further comprise a VA controller 140. The VA controller 140 may be connected with an electronic control unit 160 such as an engine control unit of the vehicle.

During wireless power transfer, the VA controller 140 may perform command and control communications and/or high-level communications with the GA controller 120 via a wireless communication link.

The operation procedure of the wireless power transfer system 100 may be explained as follows.

First, a current used for charging the battery 150 is determined in the VA 130.

Then, a power request is transferred from the VA 130 to the GA 110 via the wireless communication link.

Then, the GA 110 may recognize the power request from the VA 130, convert power supplied from the grid to high frequency AC power through the AC-to-DC converter 10 and the DC-to-AC converter 20, and transfer the converted AC power to the GA coil 40.

Then, the high frequency AC power may be transferred from the GA coil 40 to the VA coil 50 via coupling, rectified and processed in the VA 130, and finally used to charge the battery 150.

The above-described procedure continues until the battery 150 is fully charged and the VA 130 transmits a signal indicating completion of the charging to the GA.

Meanwhile, performance (efficiency and output) of the wireless power transfer system 100 may generally depend upon performance of the DC-to-AC converter 20 which shows remarkable differences in performance among the components of the GA 110. Also, the DC-to-AC converter implemented as a phase-shifted full-bridge converter may achieve high efficiency through zero voltage switching (ZVS). However, in the wireless power transfer system applied to EV or HEV, an error of alignment between primary and secondary pads or tolerance of elements such as capacitors may cause a problem that the DC-to-AC converter cannot properly perform the ZVS.

Therefore, the present embodiment may provide a DC-to-AC converter control method and a wireless power transfer method which are tolerant to the error of alignment between pads and the tolerance of elements. In the proposed method, the GA controller 120 detects a current flowing through a primary coil (i.e. GA coil) at a specific time, and controls switching frequencies of switches in the DC-to-AC converter 20 according to a level of the detected current.

The DC-to-AC converter control method which will be described below may be basically performed in the GA controller 120. However, various implementations are not restricted thereto. For example, a control part (controller) existing in the DC-to-AC converter 20 may receive a signal directly from the sensor 30, and control switching operations of the switches in the DC-to-AC converter 20. Also, according to implementations, the DC-to-AC converter control method may be performed, within a given control permission, by the VA controller 140 that is connected to the GA controller 120 via a wireless communication link. In this case, the GA controller 120 may relay command and control communications and/or high-level communications between the VA controller 140 and the sensor 30 or between the VA controller 140 and the DC-to-AC converter 20.

Figure 2:
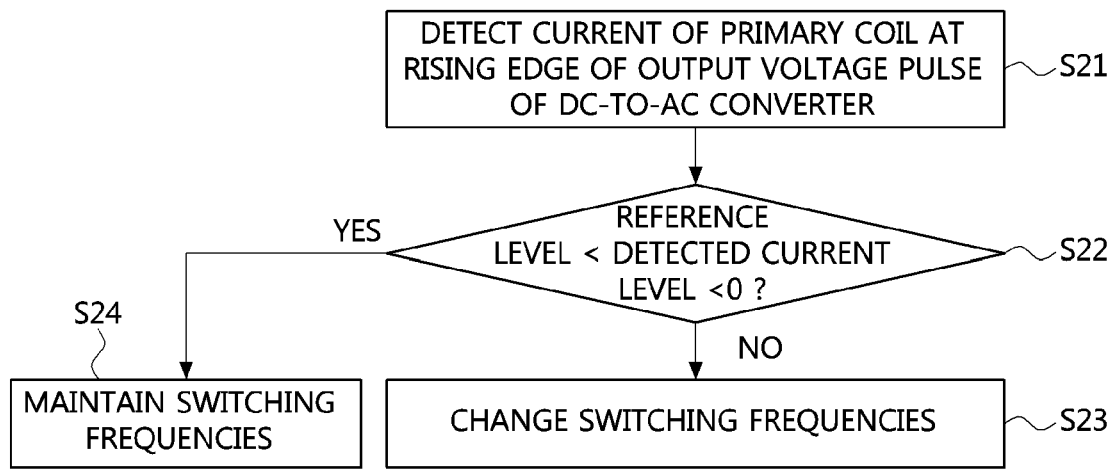
FIG. 2 is a flow chart showing a DC-to-AC converter control method according to an exemplary embodiment of the present disclosure.

FIG. 2 is a flow chart showing a DC-to-AC converter control method according to an exemplary embodiment of the present disclosure.

Referring to FIG. 2, in the DC-to-AC converter control method according to an embodiment, the DC-to-AC converter may comprise first, second, third, and fourth switches arranged in a form of a bridge circuit between a power source and a primary coil, and may be controller by the GA controller. Here, a first series circuit stage of the first and third switches, and a second series circuit stage of the fourth and second switches may be connected in parallel for the primary coil (will be explained later referring to FIG. 4).

First, the GA controller may detect a current flowing through the primary coil at a rising edge of an output voltage pulse of the DC-to-AC converter (S21).

Then, the GA controller may determine whether strength (i.e. current level) of the detected current is at a negative level which falls within a predetermined reference range (S22).

Then, when the current is not at the negative level which falls within the predetermined reference range, the GA controller may change switching frequencies (S23).

On the contrary, when the current is at the negative level which falls within the predetermined reference range, the GA controller may maintain current switching frequencies (S24).

According to the present embodiment, it can be prevented that the switches of the DC-to-AC converter cannot perform ZVS due to an error of alignment between pads comprising the primary coil and the secondary coil, and/or tolerances of capacitor elements. Thus, a DC-to-AC converter, which is a type of phase-shifted full-bridge converter and is tolerant to the error of alignment and tolerances of capacitor elements, can be provided. Especially, performance reduction of the DC-to-AC converter, which becomes severe in high-power transfer for EV or HEV, can be suppressed so that reliability and stability of a wireless power transfer system can be remarkably enhanced.

Figure 3:
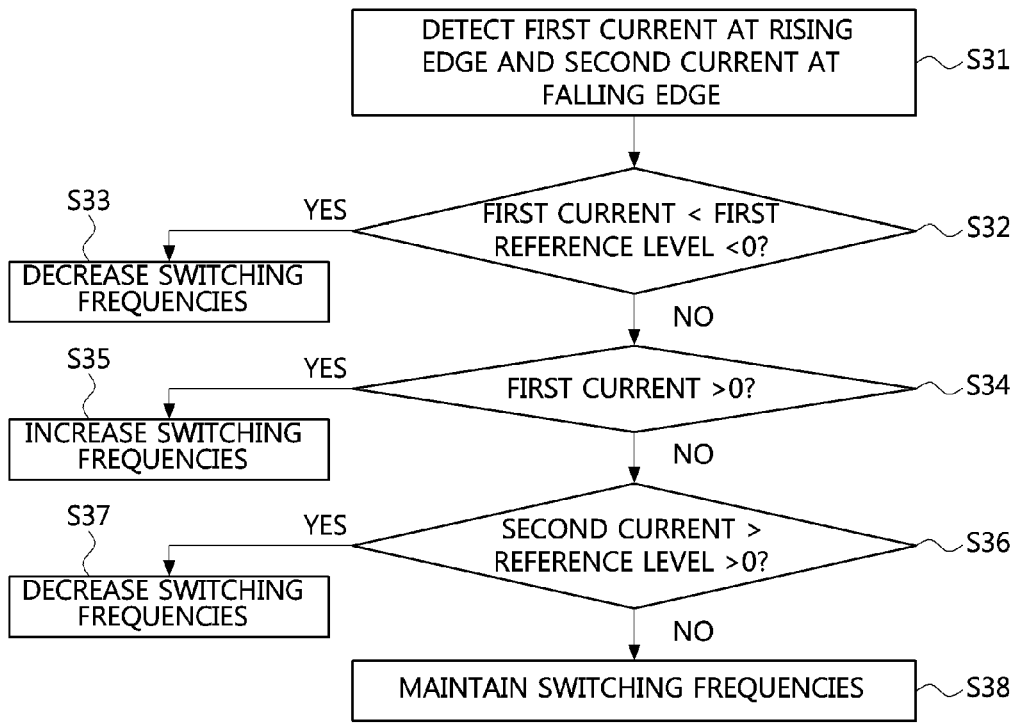
FIG. 3 is a flow chart showing a DC-to-AC converter control method according to another exemplary embodiment of the present disclosure.

FIG. 3 is a flow chart showing a DC-to-AC converter control method according to another exemplary embodiment of the present disclosure.

The DC-to-AC converter control method according to another embodiment may correspond to a more specific embodiment described with reference to FIG. 2.

Referring to FIG. 3, the GA controller may detect a first current at a rising edge, and a second current at a falling edge (S31). The rising edge may correspond to a time when an output voltage pulse of the DC-to-AC converter rises from 0V to a positive level, and the falling edge may correspond to a time when an output voltage pulse of the DC-to-AC converter falls from 0V to a negative level. The rising edge and the falling edge may be referenced by a direction from zero voltage to the positive level or the negative level, but it is not limited.

Then, the GA controller may determine whether strength of the first current is at a negative level below a first reference level (S32). When the first current is at the negative level below the first reference level, the GA controller may decrease switching frequencies of the DC-to-AC converter (S33).

Then, the GA controller may determine whether strength of the first current is at a positive level (S34). When the first current is at the positive level at the rising edge, the GA controller may increase switching frequencies of the DC-to-AC converter (S35).

Although it was explained that the step S32 is performed before the step S34, various embodiments are not restricted thereto. That is, the step S34 may be performed before the step S32. Alternatively, the step S32 and the step S34 may be performed simultaneously or in parallel.

Then, the GA controller may determine whether strength of the second current is at a positive level over a second reference level (S36). When the second current is at the positive level over the second reference level at the falling edge, the GA controller may decrease switching frequencies of the DC-to-AC converter (S37).

On the other hand, in the above-described steps S32, S34, and S36, if the first current or the second current is not at the negative level or the positive level, the GA controller may maintain current switching frequencies (S38).

Figure 4:
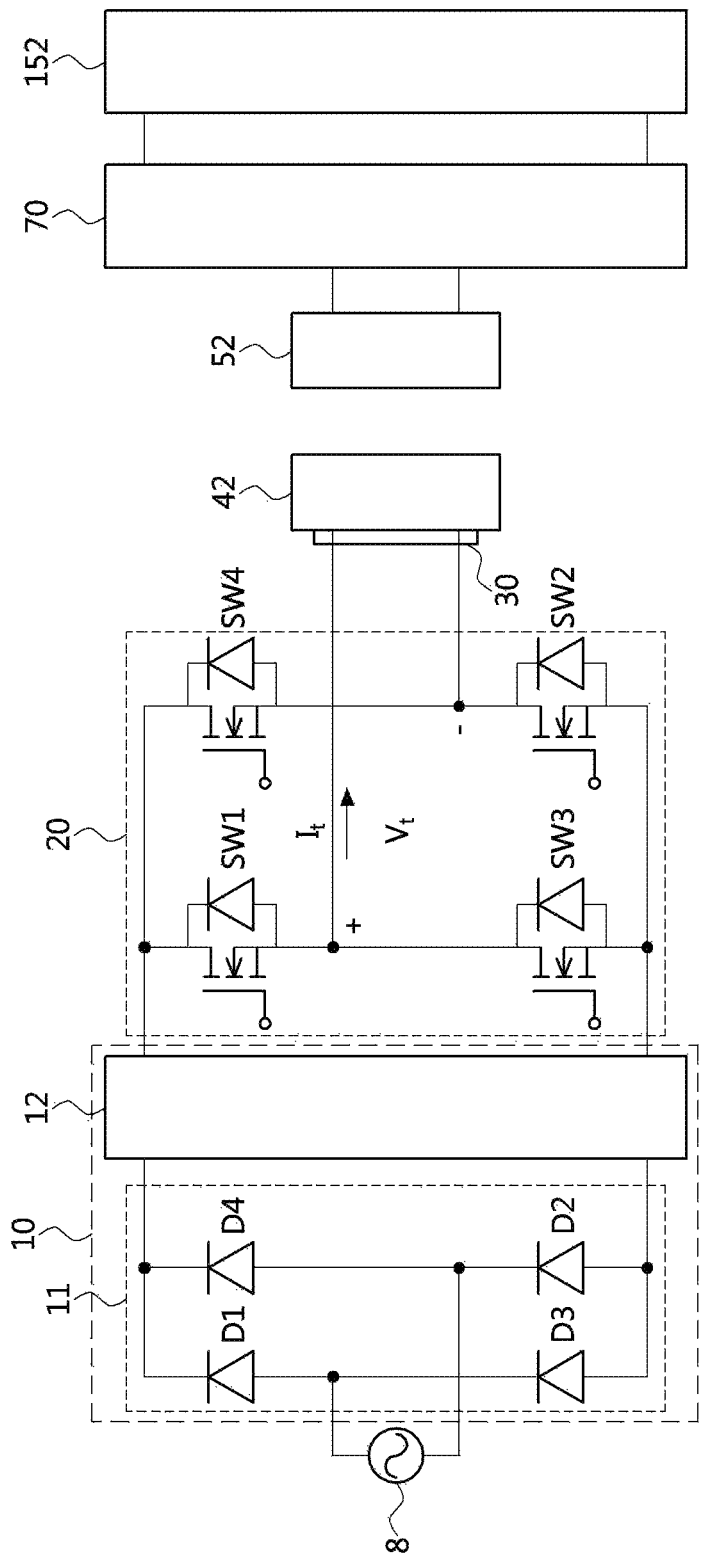
FIG. 4 is a block diagram of a wireless power transfer system which can use a DC-to-AC converter control method according to embodiments of the present disclosure.

FIG. 4 is a block diagram of a wireless power transfer system which can use a DC-to-AC converter control method according to embodiments of the present disclosure.

Referring to FIG. 4, a wireless power transfer system according to embodiments of the present disclosure may wirelessly transfer a power of a power source 8 to a battery. For this, the wireless power transfer system may include, as primary side components, an AC-to-DC converter (AC rectifier) 11, a PFC converter 12, a DC-to-AC converter 20, a sensor 30, and a primary pad 42. Also, the wireless power transfer system may include, as secondary side components, a secondary pad 52, and a rectifier and filter 70. The primary pad 42 may comprise a primary coil, and the secondary pad 52 may comprise a secondary coil.

More specifically, the AC-to-DC converter 11 may comprise first to fourth diodes D1, D2, D3, and D4 which are arranged in a form of a bridge circuit located between the power source 8 and the PFC converter 12. The AC-to-DC converter 11 may convert AC power (e.g. commercial power) of the power source 8 to DC power. Although the AC-to-DC converter 11 is configured to comprise four diodes in the present embodiment, configuration of the AC-to-DC converter 11 is not restricted thereto. For example, at least one of the four diodes may be substituted with a switch having a diode function.

The PFC converter 12 may comprise inductors, switches, diodes, and capacitors. Also, a controller of the PFC converter 12 may convert, by controlling operations of the switches according to a waveform or phase of an input current or voltage, an output voltage of the AC-to-DC converter 11 to a substantially constant voltage thereby enhancing power efficiency. The PFC converter 12 may be classified into a boost type, a buck type, a buck-boost type, and a resonance type. The controller of the PFC converter 12 may be an independent controller. However, it may be implemented using at least part of the GA controller (refer to 120 of FIG. 1) or as a component performing corresponding functions.

The above-described AC-to-DC converter 11 and the PFC converter 12 may correspond to the AC-to-DC converter (refer to 10 of FIG. 1), and may also be referred to as a primary power converting part having a PFC function.

The DC-to-AC converter 20 may be a phase-shifted full-bridge converter. Also, the DC-to-AC converter 20 may comprise first to fourth switches SW1, SW2, SW3, and SW4 each of which has a first terminal, a second terminal, and a control terminal.

A first terminal of the first switch SW1 is connected with a second terminal of the third switch SW3, and a second terminal of the first switch SW1 and a first terminal of the third switch SW3 are connected to both ends of the primary coil. A first terminal of the fourth switch SW4 is connected with a second terminal of the second switch SW2, and a second terminal of the fourth switch SW4 and a first terminal of the second switch SW2 are also connected to both ends of the primary coil. Also, a first connection node of the first and third switches SW1 and SW3 and a second connection node of the fourth and second switches SW4 and SW2 are connected to both output ends of the PFC converter 12 or the AC-to-DC converter 11.

The output voltage $V_t$ of the DC-to-AC converter 20 may correspond to a voltage between the first connection node and the second connection node, and the output current $I_t$ of the DC-to-AC converter 20 may correspond to a current flowing from the first connection node to the primary coil. Also, when the DC-to-AC converter 20 converts the power from the power source 8 (i.e. power-factor-corrected DC power) to a DC power having a different level by controlling the first to fourth switches SW1 to SW4 based on control signals from a controller of the DC-to-AC converter 20, according to an input voltage or an input current, a series circuit constituted by the first and third switches SW1 and SW3 may become a first stage, and a series circuit constituted by the fourth and second switches SW4 and SW2 may become a second stage.

The controller of the DC-to-AC converter 20 may be an independent controller. However, without being restricted thereto, it may be implemented using at least part or a corresponding functional component of the GA controller (120 of FIG. 1).

The primary pad 42 may include the primary coil (or, GA coil). The primary pad 42 may further comprise a means for helping magnetic field generation in the primary coil, and a means for supporting or protecting the primary coil.

The rectifier and filter 70 may comprise a rectifier which is connected to the secondary coil and rectifies an AC voltage induced in the secondary coil, and a filter which is located in a back end of the rectifier and generates a smooth DC voltage by reducing ripples of a DC voltage obtained by the rectifier. The rectifier and filter 70 may be connected to batteries in a battery assembly 152.

Also, according to implementations, a back end of the rectifier and filter 70 may further comprise a regulator or an additional converter. In this case, the battery assembly 152 may be implemented as further including an additional converter as well as the batteries. The additional converter may be enclosed in a single housing together with the batteries.

According to the present embodiment, the AC commercial power may be rectified to a positive voltage through the AC rectifier 11, and converted to a constant DC voltage through the PFC converter 12. The DC-to-AC converter 20, which is a phase-shifted full-bridge converter, may convert the constant DC voltage to a high-frequency DC voltage/current. The high-frequency DC voltage/current may be converted to a high-frequency AC voltage/current by a DC-to-AC converter and be transferred to the primary pad 42. Then, an AC voltage is transferred to the secondary pad 52 inductively coupled with the primary pad 42, and the AC voltage may be converted to a DC voltage through the rectifier and filter 70. The secondary side of the wireless power transfer system may use the DC voltage to directly charge the batteries or to charge the batteries through the additional converter.

Figure 5:
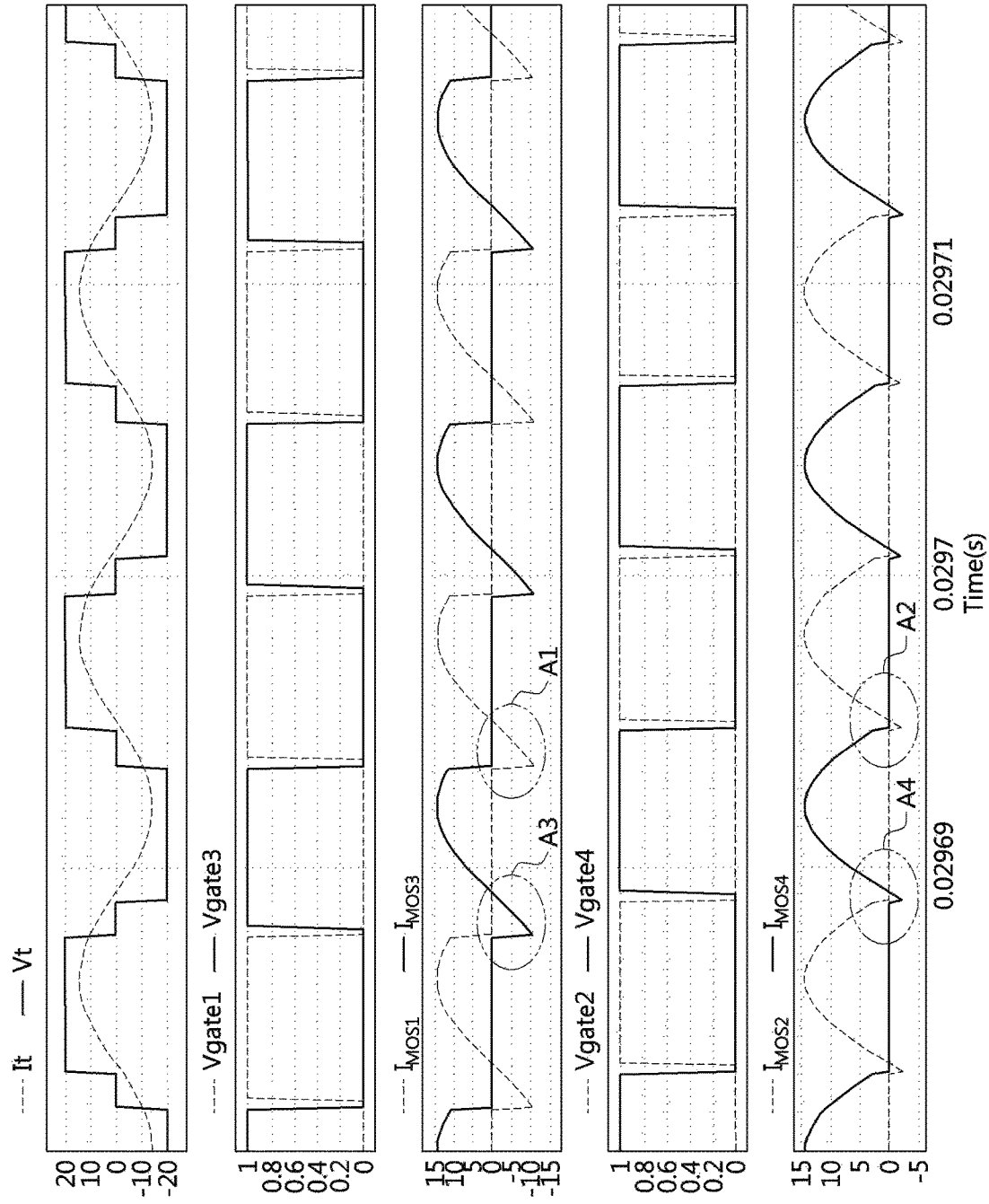
FIG. 5 is a timing diagram of an optimal operation of a DC-to-AC converter according to an exemplary embodiment of the present disclosure.

FIG. 5 is a timing diagram of an optimal operation of a DC-to-AC converter according to an exemplary embodiment of the present disclosure.

Referring to FIG. 5, a DC-to-AC converter according to the present embodiment may be a phase-shifted full-bridge converter comprising first to fourth switches. A controller of the DC-to-AC converter may perform ZVS in order to improve efficiency of the converter.

An optimal operation of the DC-to-AC converter may be explained as follows.

When the DC-to-AC converter operates, an output end of the DC-to-AC converter may supply, to the primary coil, a current $I_t$ and a voltage $V_t$. The current $I_t$ may have a sine wave form with a maximum value of about 14 A as an example, and the voltage $V_t$ may have a pulse form with a maximum value of about 20V as an example.

The third switch SW3 of the DC-to-AC converter may perform on-off operations in response to a third control signal $V_{gate3}$ having a pulse form with a predetermined voltage level (e.g. 1V), and the first switch SW1 of the DC-to-AC converter may perform on-off operations in response to a first control signal $V_{gate1}$ having a pulse form with a predetermined voltage level (e.g. 1V). In a time-axis, on-pulses of the third control signal and on-pulses of the first control signal may be applied to respective switches SW3 and SW1 alternately, and they may maintain a predetermined gap from each other.

In the above-described case, when the third switch performs on-off operations in response to the third control signal, a current $I_{MOS3}$ of the third switch SW3 falls from 0V to a negative level for zero-voltage switching (refer to a dotted line circle A3) at a falling edge of a positive pulse of $V_t$ by the third control signal, rises from the negative level to a positive level during a period of zero and a negative pulse of $V_t$, and falls from the positive level to zero at a rising edge of the negative pulse of $V_t$ by the third control signal.

Also, when the first switch SW1 performs on-off operations in response to the first control signal, a current $I_{MOS1}$ of the first switch SW1 falls from 0V to a negative level for zero-voltage switching (refer to a dotted line circle A1) at a rising edge of a negative pulse of $V_t$ relating to the first control signal, rises from the negative level to a positive level during a period of zero and a positive pulse of $V_t$ relating to the first control signal, and falls to 0V at a falling edge of the positive pulse of $V_t$ relating to the first control signal.

Similarly, the fourth switch SW4 of the DC-to-AC converter may perform on-off operations in response to a fourth control signal $V_{gate4}$ with a pulse form having a predetermined voltage level (e.g. 1V), and the second switch SW2 of the DC-to-AC converter may perform on-off operations in response to a second control signal $V_{gate2}$ with a pulse form having a predetermined voltage level (e.g. 1V). In a time-axis, on-pulses of the fourth control signal and on-pulses of the second control signal may be applied to respective switches SW4 and SW2 alternately, and they maintain a predetermined gap from each other.

In the above-described case, when the fourth switch SW4 performs on-off operations in response to the fourth control signal, a current $I_{MOS4}$ of the fourth switch SW4 from 0V falls to a negative level which is slightly lower than 0V (e.g. by about 1V) for zero-voltage switching (refer to a dotted line circle A4) of the fourth switch SW4 at a falling edge of a negative pulse of $V_t$ and a falling edge of a gate pule of the second control signal, starts to rise from the negative level which is slightly lower than 0V to a positive level at a rising edge of a just following gate pulse of the fourth control signal, and pass a positive maximum level during a period of the positive pulse of $V_t$, and falls to 0V at a rising edge of a next positive pulse of $V_t$ and a falling edge of a gate pulse of the fourth control signal.

Also, when the second switch SW2 performs on-off operations in response to the second control signal, a current $I_{MOS2}$ of the second switch SW2 falls to a negative level which is slightly lower than 0V (e.g. by about 1V) for zero-voltage switching (refer to a dotted line circle A2) of the second switch SW2 at a rising edge of a positive pulse of $V_t$, starts to rise from the negative level which is slightly lower than 0V to a positive level at a rising edge of a just following gate pulse of the second control signal, and pass a positive maximum level during a period of the positive pulse of $V_t$, and falls to 0V at a falling edge of a next negative pulse of $V_t$ and a falling edge of a gate pulse of the second control signal.

In the above-described cases, the DC-to-AC converter may perform ZVS of all the switches through soft switching driven by a switch driver of the controller, thereby operating as maintaining optimal states.

However, when misalignment between the primary pad including the primary coil and the secondary pad including the secondary coil occurs, or manufacturing tolerances of pads or capacitors exist, resonance may be broken while performing wireless charging. Also, inverse-currents through switches in the converter may be generated excessively, ZVS of the converter may not be guaranteed, and efficiency of the wireless power transfer system may degrade.

Also, switches having large current capacity should be used in order to cope with the inverse-currents. In addition, if the ZVS is not guaranteed, increase of electromagnetic interference (EMI) caused by hard switching may demand a filter for reducing the EMI, whereby the size and material cost of the total system are increased.

Figure 6:
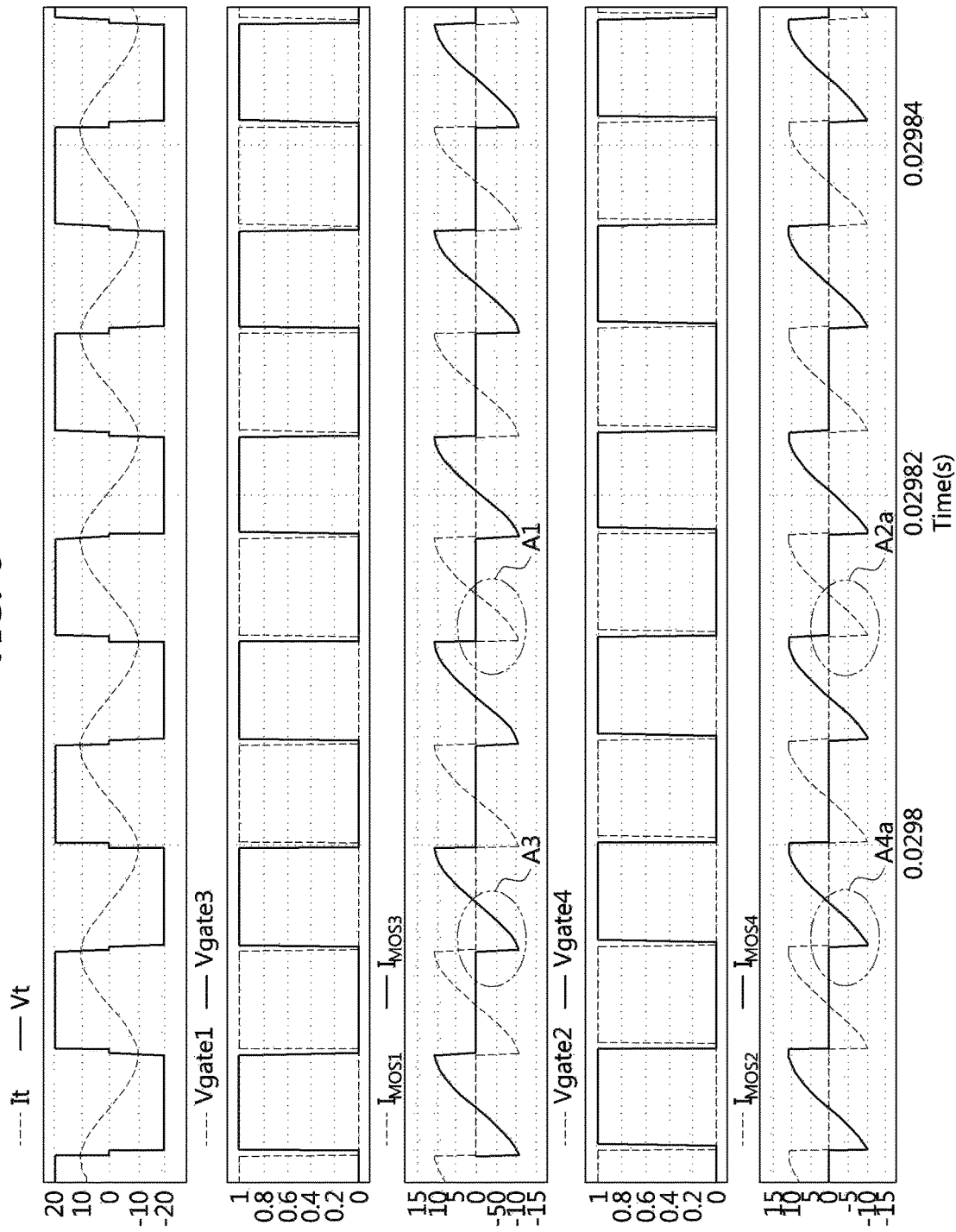
FIG. 6 is a timing diagram of an operation of a DC-to-AC converter according to a comparative example.

The unfavorable operational condition of the DC-to-AC converter, the case where excessive inverse-currents flow through switches, may be explained referring to FIG. 6. Also, the unfavorable operational condition of the DC-to-AC converter, the case where ZVS is not properly performed in at least one switch, may be explained referring to FIG. 7.

FIG. 6 is a timing diagram of an operation of a DC-to-AC converter according to a comparative example.

As illustrated in FIG. 6, currents $I_{MOS4}$ and $I_{MOS2}$ of the lag stage switches (i.e. SW4 and SW2) should not fall to a negative level which is too much lower than 0V for ZVS of the lag stage switches.

However, when inverse currents in the lag stage switches increase, it can be identified that the current $I_{MOS4}$ of the fourth switch SW4 in the lag stage and the current $I_{MOS2}$ of the second switch SW2 in the lag stage (refer to A4a and A2a) fall to a negative level from 0V by more than a predetermined reference level, similarly to the currents $I_{MOS3}$ and $I_{MOS1}$ of the third and first switches SW3 and SW1 in the lead stage.

Here, the predetermined reference level may be a value which is greater than an error range (about −1V to +1V) corresponding to 0V, and equal to or less than about 5V. That is, the predetermined reference level may be a value of 4V~6V.

According to the above comparative example, since relatively large inverse currents flow through switches in the DC-to-AC converter, switches having such the large capacity should be used. Also, in the comparative example, since ZVS cannot be guaranteed, EMI increases, and additional measures for the increased EMI should be prepared.

Figure 7:
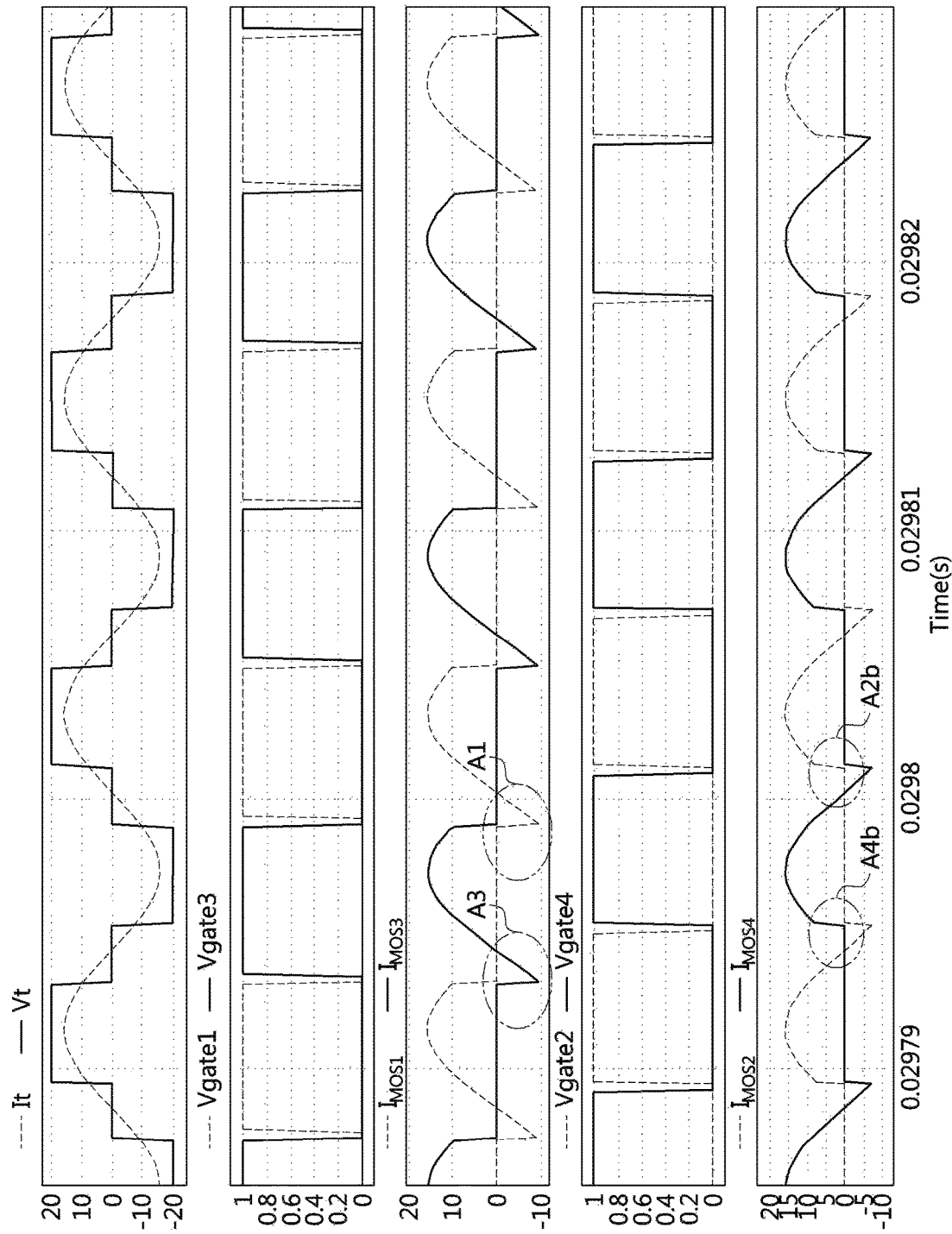
FIG. 7 is a timing diagram of an operation of a DC-to-AC converter according to another comparative example.

FIG. 7 is a timing diagram of an operation of a DC-to-AC converter according to another comparative example.

As illustrated in FIG. 7, for ZVS, currents $I_{MOS3}$ and $I_{MOS2}$ should reach 0V alternately ahead of each other at a falling edge of respective switches, and currents $I_{MOS4}$ and $I_{MOS2}$ should reach 0V alternately ahead of each other without falling to an excessive negative level.

However, when manufacturing tolerances of pads or capacitors exist, the current $I_{MOS4}$ of the fourth switch SW4 and the current $I_{MOS2}$ of the second switch SW2 may fall to a negative level from zero by more than the predetermined reference level. Although a level of the current $I_{MOS4}$ of the fourth switch SW4 (refer to A4b) and a level of the current $I_{MOS2}$ of the second switch SW2 (refer to A2b) are less than a level of the current $I_{MOS3}$ of the third switch SW3 (refer to A3) and a level of the current $I_{MOS1}$ of the first switch SW1 (refer to A1), ZVS of the fourth and second switches SW4 and SW2 is unavailable because $I_{MOS4}$ and $I_{MOS2}$ fall into the negative level deeper than the predetermined reference level.

In the above-described case, since all the switches cannot perform ZVS in the DC-to-AC converter according to the comparative example, efficiency of the converter may degrade remarkably. That is, the DC-to-AC converter according to the comparative example cannot properly perform ZVS due to existence of manufacturing tolerances of elements, and thus power or efficiency of the wireless power system may degrade.

Figure 8:
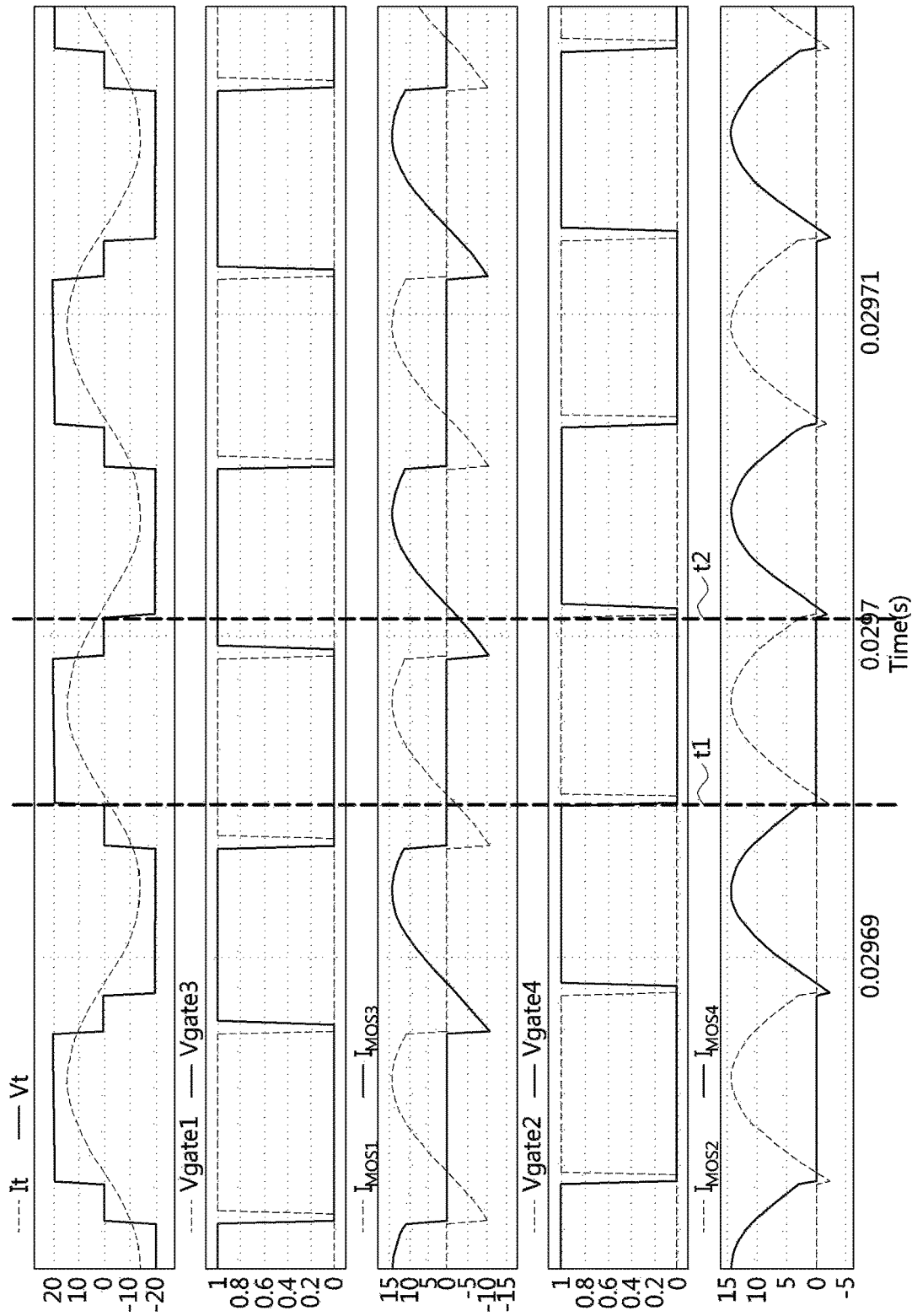
FIG. 8 is a timing diagram of an operation of a DC-to-AC converter according to an exemplary embodiment of the present disclosure.

FIG. 8 is a timing diagram of an operation of a DC-to-AC converter according to an exemplary embodiment of the present disclosure.

Referring to FIG. 8, a DC-to-AC converter control method according to an embodiment of the present disclosure may resolve the above-described problems that inverse currents flow through switches or ZVS cannot be properly performed due to misalignment between the primary and secondary coils and/or manufacturing tolerances of elements.

For this, in the DC-to-AC converter control method according to an embodiment, the following two steps are performed. First, a current $I_t$ flowing through the primary coil may be sensed. Second, gate pulses of lag stage switches of the DC-to-AC converter which is a phase-shifted full-bridge converter are sensed. Here, the lag stage may correspond to a second stage to which signals later than signals of a first stage of the DC-to-AC converter are applied. That is, the lag stage switches may be the fourth switch SW4 and the second switch SW2. Also, the gate pulses may correspond to control signals applied respectively to control terminals of the fourth switch SW4 and the second switch SW2.

The above-described two steps can resolve the above-described problems of the conventional DC-to-AC converter as follows.

First, a controller of the DC-to-AC converter, the GA controller, the VA controller, or a combination of them (hereinafter, 'controller') may detect a current (hereinafter, 'a first current') flowing through the primary coil at the rising edge (t1) of an output voltage of the DC-to-AC converter. Also, the controller may detect a current (hereinafter, 'a second current') flowing through the primary coil at the falling edge (t2) of the output voltage of the DC-to-AC converter.

Then, the controller may decrease switching frequencies of the DC-to-AC converter when the current $I_t$ of the primary coil has a negative level which is excessively lower than zero by the predetermined reference level at the rising edge t1.

Also, the controller may decrease switching frequencies of the DC-to-AC converter when the current $I_t$ of the primary coil has a positive level which is excessively higher than zero by the predetermined reference level at the falling edge t2.

In the above-described case, since the current $I_t$ of the primary coil leads the voltage $V_t$ when the DC-to-AC converter decreases switching frequencies, inverse current flowing through the switches may be reduced.

Meanwhile, the controller may increase switching frequencies of the DC-to-AC converter when the current $I_t$ of the primary coil is a positive level at the rising edge t1.

In the above-described case, since the current $I_t$ of the primary coil lags the voltage $V_t$ when the DC-to-DC converter increases switching frequencies, ZVS in all the switches may become possible.

According to the present embodiment, the primary current may be detected at rising and falling edges of the output voltage signal according to control signals applied to the lag stage switches, and switching frequencies may be actively varied according to a level of the detected primary current. Thus, inverse current flowing through switches may be reduced, and ZVS in all the switches can be performed (refer to A3, A1, A4, and A2 of FIG. 5), whereby the efficiency and output of the DC-to-AC converter can be enhanced and sudden degradation in the efficiency and output under such the unfavorable conditions can be prevented.

FIG. 9 is a graph showing an advantage of a DC-to-AC converter control method according to an exemplary embodiment of the present disclosure.

As described above, when the DC-to-AC converter control method according to the present disclosure, efficiency and output of the wireless power transfer system can be enhanced.

That is, as illustrated in (a) of FIG. 9, even when misalignment between the primary coil (or, the primary pad in which the primary coil is installed) and the secondary coil (or, the secondary pad in which the secondary coil is installed) exists in forward/backward, left/right, upward/downward, or their combinational direction, the efficiency and output may gradually degrade without rapid degradation when the misalignment increases.

Also, as illustrated in (b) of FIG. 9, even when elements of the primary pad, a first capacitor connected to the primary coil of the primary pad, the secondary pad, or a second capacitor connected to the secondary coil of the secondary pad have manufacturing tolerances, the efficiency and output may gradually degrade without rapid degradation when the manufacturing tolerances increase.

A case of the combination of (a) and (b) of FIG. 9 is shown in (c) of FIG. 9.

As described above, using the DC-to-AC converter control method according to embodiments of the present disclosure, performance (efficiency or output) of the wireless power transfer system can be maintained through stable ZVS operations even when misalignment between pads or manufacturing tolerances of elements exist. Also, as explained referring to the comparative examples performing unstable ZVS operations, EMI problems can be solved without using additional filters, and thus the size and material cost of the GA and/or VA of the wireless power transfer system can be reduced.

Figure 10:
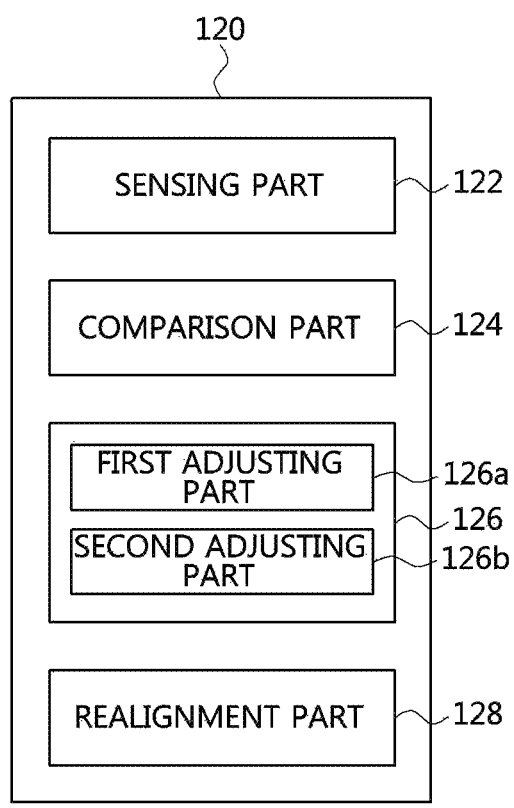
FIG. 10 is a block diagram to explain a structure of a controller which can be used in a ground assembly according to an exemplary embodiment of the present disclosure.

FIG. 10 is a block diagram to explain a structure of a controller which can be used in a ground assembly according to an exemplary embodiment of the present disclosure.

Referring to FIG. 10, a GA controller 120 according to an embodiment may comprise a sensing part 122, a comparison part 124, an adjusting part 126, and a realignment part 128. Each component of the GA controller 120 may be explained in detail as follows.

The sensing part 122 may receive a signal from a sensor as connected with the sensor. The sensor may detect a current or voltage. Also, the sensing part 122 may detect the rising edge and the falling edge in the output voltage pulse of the DC-to-AC converter. Also, the sensing part 122 may detect the first current flowing through the primary coil at the rising edge, and the second current flowing through the primary coil at the falling edge.

The output voltage pulse may correspond to the output voltage of the DC-to-AC converter, which has a form of pulse. The rising edge may correspond to a time when the output voltage pulse rises from zero to a positive level. The falling edge may correspond to a time when the output voltage pulse falls from zero to a negative level.

The above-described sensing part 122 may include an analog-to-digital converter (ADC) outputting a digitalized value indicating strength or amount of an analog value sensed by the sensor.

The comparison part 124 may output a first comparison result when the first current is a negative level lower than a preconfigured first reference level at first rising edge. Also, the comparison part 124 may output a second comparison result when the first current is a positive level at the rising edge. Also, the comparison part 124 may output a third comparison result when the second current is a positive level higher than a preconfigured second reference level at the falling edge.

Also, the comparison part 124 may compare a current output of the wireless power transfer system with a preconfigured reference output.

The comparison part 124 may be implemented as an integrated circuit or as including an operational amplifier.

The adjusting part 126 may comprise a first adjusting part 126a and a second adjusting part 126b. The first adjusting part 126a may comprise a means for decreasing switching frequencies of the DC-to-AC converter, or a component performing a corresponding function, according to the comparison result of the comparison part 124. Similarly, the second adjusting part 126b may comprise a means for increasing switching frequencies of the DC-to-AC converter, or a component performing a corresponding function, according to the comparison result of the comparison part 124.

The adjusting part 126 may be implemented as including switch drivers controlling on-off operations of at least four switches in the DC-to-AC converter.

The realignment part 128 may realign the primary and secondary pads when the detected current output of the system is less than the preconfigured reference output. The realignment part 128 may transfer signals or information needed for the realignment to the GA controller and/or VA controller. In this case, the GA controller and/or VA controller may perform alignment between the pads again by moving at least one of the primary and secondary pads, according to a realignment request (i.e. the signals and information) from the realignment part 128, to a forward, backward, left, right, upward, downward, or their combinational direction.

The realignment part 128 may comprise a means for generating the realignment request including realignment information and transferring the realignment request to the GA controller and/or VA controller, or a component performing a corresponding function. Also, the realignment part 128 may be implemented as a means or component performing command and control communications directly with an actuator connected to the primary pad or the secondary pad.

On the other hand, the controller implementing the DC-to-AC converter control methods according to embodiments of the present disclosure is not restricted to the above-described structure of GA controller. That is, the above-described functional components may also be implemented as included in the controller in the DC-to-AC converter, or may also be implanted as included in the VA controller connected wirelessly with the GA controller 120.

Figure 11:
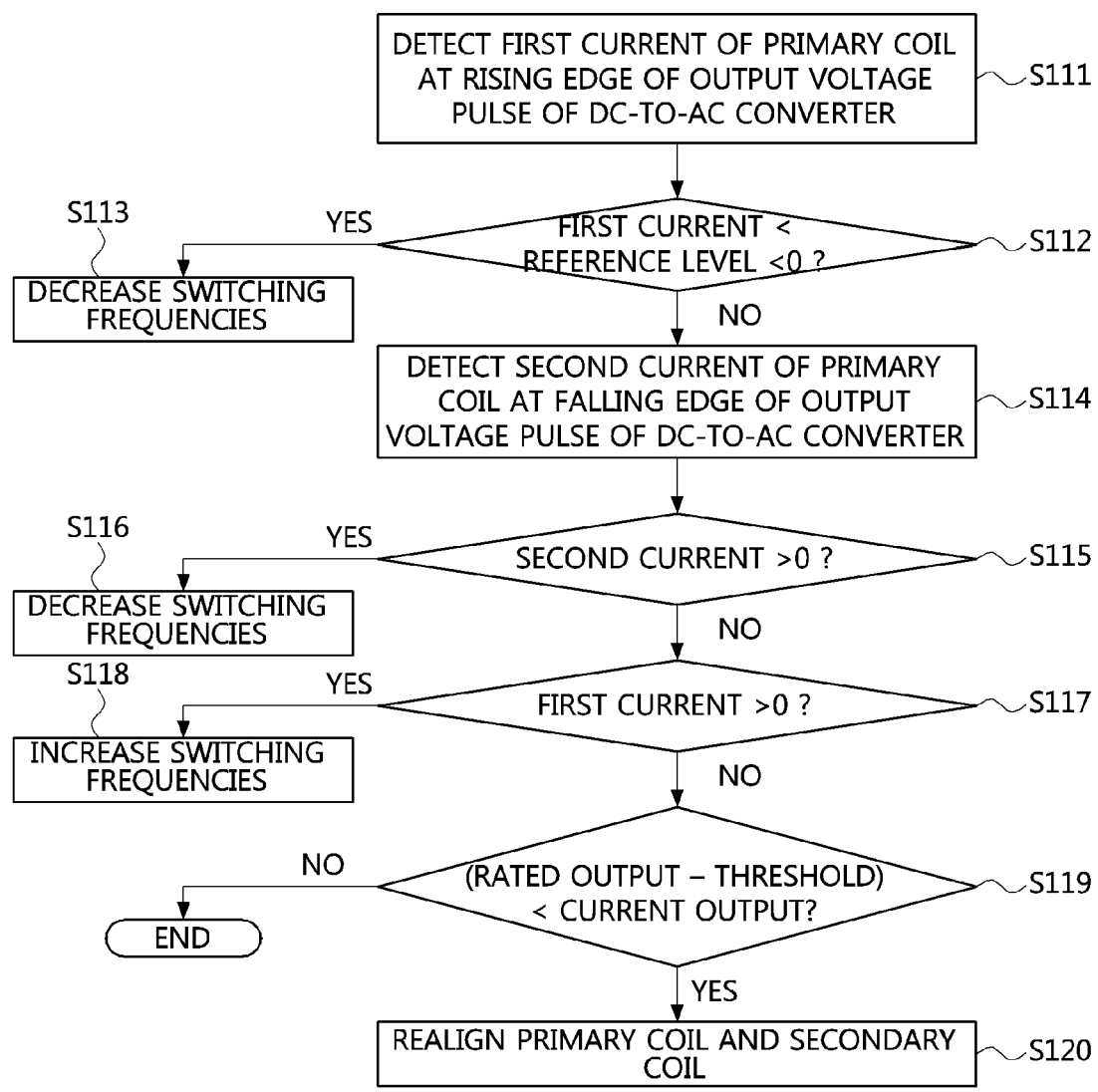
FIG. 11 is a flow chart showing a wireless power transfer method using a ground assembly of FIG. 10.

FIG. 11 is a flow chart showing a wireless power transfer method using a ground assembly of FIG. 10.

Referring to FIG. 11, the wireless power transfer method according to the present embodiment may be performed by a GA. However, according to implementations, the wireless power transfer method according to the present embodiment may be performed by a VA controller connected to a GA controller via a wireless communication link, a VA in which the VA controller is included, or an electronic control unit in the vehicle.

First, the GA controller of the VA or the controller of the DC-to-AC converter may detect a first current flowing through the primary coil at a rising edge of an output voltage pulse of the DC-to-AC converter (S111).

Then, the controller may determine whether the first current has a negative level lower than a reference level (S112). When the first current has a negative level lower than the reference level, the controller may decrease switching frequencies of the DC-to-AC converter (S113).

Then, the controller may detect a second current flowing through the primary coil at a falling edge of the output voltage pulse of the DC-to-AC converter (S114).

Then, the controller may determine whether the second current has a positive level (S115). When the second current has a positive level, the controller may further decrease switching frequencies of the DC-to-AC converter (S116).

Then, the controller may determine whether a first current has a positive level at a new rising edge following the falling edge (S117). The step S117 may be performed when the second current is not at a positive level in the step S115. However, various embodiments are not restricted thereto. Also, the controller may increase switching frequencies of the DC-to-AC converter when the first current has a positive level at the new rising edge (S118).

Then, the controller may determine whether a current output of the wireless power transfer system is less than a value obtained by subtracting a predetermined threshold from a rated output of the system (S119). The step S119 is performed for detecting a case in which performance degrades excessively although suppression of system performance degradation due to misalignment between the pads or manufacturing tolerances of elements is attempted through the above-described procedures.

After the step S119, when the current output of the wireless power transfer system is less than the value (i.e. rate output—predetermined threshold), the wireless power transfer may be stopped and alignment between the primary and secondary coils may be performed again (S120). On the contrary, when the current output of the system is equal to or larger than the value, the basic process of the wireless power transfer according to embodiments of the present disclosure may be maintained or resumed.

According to the above-described embodiments, even when misalignment between the primary coil and the secondary coil exists in forward/backward, left/right, upward/downward, or their combinational direction, rapid degradation in the efficiency and output of the system can be prevented. Also, the wireless power transfer procedure can be effectively managed, if necessary, through realignment of the pads.

While the exemplary embodiments of the present disclosure and their advantages have been described in detail, it should be understood that various changes, substitutions and alterations may be made herein without departing from the scope of the disclosure.

What is claimed is:

1. A method for controlling a direct current to alternating current (DC-to-AC) converter of a ground assembly used for wireless power transfer, which includes first, second, third, and fourth switches arranged in a form of a bridge circuit between a power source and a primary coil, the method comprising:

detecting a first current flowing through the primary coil at a rising edge of an output voltage signal of the DC-to-AC converter and a second current flowing through the primary coil at a falling edge of the output voltage signal of the DC-to-AC converter, wherein the rising edge corresponds to a time when the output voltage signal of the DC-to-AC converter rises from 0V to a positive level, and the falling edge corresponds to a time when the output voltage signal of the DC-to-AC converter falls from 0V to a negative level;

decreasing a switching frequency of the DC-to-AC converter when the first current has an excessive negative level lower than a first reference level which is negative at the rising edge and the second current has an excessive positive level higher than a second reference level which is positive at the falling edge; and increasing the switching frequency of the DC-to-AC converter when the first current has a positive level at the rising edge.

2. A ground assembly comprising:

a first power converting part connected to a power source;

a primary coil;

a direct current to alternating current (DC-to-AC) converter including first, second, third, and fourth switches arranged in a form of a full bridge circuit between the first power converting part and the primary coil;

a sensor connected to the primary coil and detecting a current and a voltage of the primary coil; and a controller connected to the sensor and controlling the DC-to-AC converter, wherein the controller detects, via the sensor, a first current flowing through the primary coil at a rising edge of an output voltage signal of the DC-to-AC converter and a second current flowing through the primary coil at a falling edge of the output voltage signal of the DC-to-AC converter, and changes a switching frequency of the DC-to-AC converter according to a level of the first current or the second current, the rising edge corresponding to a time when the output voltage signal of the DC-to-AC converter rises from 0V to a positive level, and the falling edge corresponding to a time when the output voltage signal of the DC-to-AC converter falls from 0V to a negative level, wherein the controller decreases the switching frequency of the DC-to-AC converter, when the first current has an excessive negative level lower than a first reference level which is negative at the rising edge, and the second current has an excessive positive level higher than a second reference level which is positive at the falling edge, and wherein the controller increases the switching frequency of the DC-to-AC converter when the first current has a positive level at the rising edge.

3. The ground assembly according to claim 2, wherein the controller comprises:

a sensing part configured to detect a level of a voltage or current sensed by the sensor;

a comparison part configured to compare the level of the current with zero or the first and second reference levels; and an adjusting part configured to change the switching frequency of the DC-to-AC converter according to a comparison result of the comparison part.

4. The ground assembly according to claim 3, further comprising a realignment part configured to realign the primary coil and a secondary coil by moving the primary coil, the secondary coil, or both according to a current output power level after the adjusting part changes the switching frequency.

5. The ground assembly according to claim 2, wherein the DC-to-AC converter is a phase-shifted full-bridge converter.

6. The ground assembly according to claim 5, wherein, in the DC-to-AC converter, a first terminal of the first switch is connected to a second terminal of the third switch, a second terminal of the first switch and a first terminal of the third switch are connected to both ends of the primary coil, a first terminal of the fourth switch is connected to a second terminal of the second switch, a second terminal of the fourth switch and a first terminal of the second switch are connected to the both ends of the primary coil, and a first connection node of the first and third switches and a second connection node of the fourth and second switches are connected to both output ends of the first power converting part.

7. A wireless power transfer method performed in a controller of a wireless power transfer system, the method comprising:

detecting a first current flowing through a primary coil at a rising edge of an output voltage signal of a direct current to alternating current (DC-to-AC) converter located between a power source and the primary coil, wherein the rising edge corresponds to a time when the output voltage signal of the DC-to-AC converter rises from 0V to a positive level;

detecting a second current flowing through the primary coil at a falling edge of the output voltage signal of the DC-to-AC converter, wherein the falling edge corresponds to a time when the output voltage signal of the DC-to-AC converter falls from 0V to a negative level;

decreasing a switching frequency of the DC-to-AC converter when the first current has an excessive negative level lower than a first reference level which is negative at the rising edge and the second current has an excessive positive level higher than a second reference level which is positive at the falling edge; and increasing the switching frequency of the DC-to-AC converter when the first current has a positive level at the rising edge.

8. The method according to claim 7, further comprising:

after the changing, comparing a current output of the wireless power transfer system with a reference output; and realigning the primary coil and a secondary coil which inductively couples with the primary coil by moving the primary coil, the secondary coil, or both according to a comparison result in the comparing.

9. The method according to claim 7, wherein the controller includes at least one of a ground assembly (GA) controller included in a GA of the wireless power transfer system, a controller in the DC-to-AC converter in the GA, and a vehicle assembly (VA) controller connected with the GA controller via a wireless communication link.

* * * * *